Aug. 5, 1958 E. W. YETTER 2,846,671

MAGNETIC MATRIX

Filed June 29, 1955 4 Sheets-Sheet 1

| | $2^0$ | $2^1$ | $2^2$ | $2^3$ |
|---|---|---|---|---|
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 | 0 | 1 | 0 | 1 |
| 11 | 1 | 1 | 0 | 1 |
| 12 | 0 | 0 | 1 | 1 |
| 13 | 1 | 0 | 1 | 1 |
| 14 | 0 | 1 | 1 | 1 |
| 15 | 1 | 1 | 1 | 1 |

INVENTOR

EDWARD W. YETTER

BY Charles C. English

AGENT

INVENTOR
EDWARD W. YETTER
BY Charles C. English
AGENT

INVENTOR
EDWARD W. YETTER
BY Charles C. English
AGENT

INVENTOR
EDWARD W. YETTER
BY Charles C. English
AGENT

United States Patent Office 2,846,671

Patented Aug. 5, 1958

2,846,671

MAGNETIC MATRIX

Edward W. Yetter, Chadds Ford, Pa., assignor, by mesne assignments, to Sperry Rand Corporation, New York, N. Y., a corporation of Delaware Application June 29, 1955, Serial No. 518,910

19 Claims. (Cl. 340—174)

This invention relates to a matrix using magnetic cores. Broadly speaking, such a matrix is well known in the prior art but the earlier devices had disadvantages in two main respects. First, there were losses in the system and secondly there were difficulties with respect to driving the system.

One object of the present invention is to provide a magnetic matrix in which the system has gain, whereby there is more output from its than there is input.

Another object of the invention is to provide a magnetic matrix with an improved drive therefor.

Still another object of the invention is to provide a more reliable and efficient magnetic matrix.

Other objects of the invention will appear as this description proceeds.

In carrying out the invention, diodes are connected in the output leads of the magnetic matrix in such a way that the system has gain and therefore more output power than input power.

Another feature of the invention includes driving the input of the matrix with devices of the magnetic amplifier type. This results in a great improvement in the operation of the system.

The cores of the magnetic amplifiers hereinafter referred to may be made of a variety of materials, among which are the various types of ferrites and the various magnetic tapes, including Orthonik and 4–79 Moly-permalloy. These materials may be given different heat treatments to give them different desired properties. The magnetic material employed in the cores should preferably but not necessarily have a substantially rectangular hysteresis loop. Cores of this character are well known in the art. In addition to the wide variety of materials available, the core may be constructed in a number of geometries including both closed and open paths; for example, cup-shaped, strips, and toroidal-shaped cores are possible. Those skilled in the art understand that when the core is operating on the horizontal (or substantially saturated) portions of its hysteresis loop, the core is generally similar in operation to an air core, in that the coil on the core is of low impedance. On the other hand, when the core is operating on the vertical (or unsaturated) portions of the hysteresis loop, the impedance of the coil on the core will be high.

Figures 1, 8:
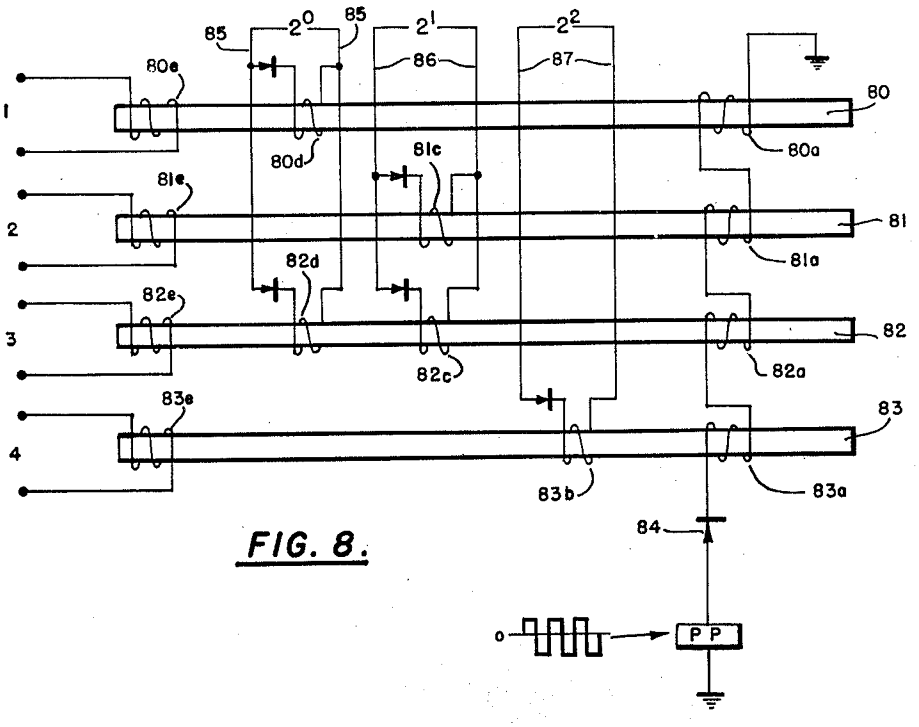
Figure 1 is a table showing the conversion between the binary and decimal systems.
Figure 8 is a further modified form of the invention.
Figure 2:
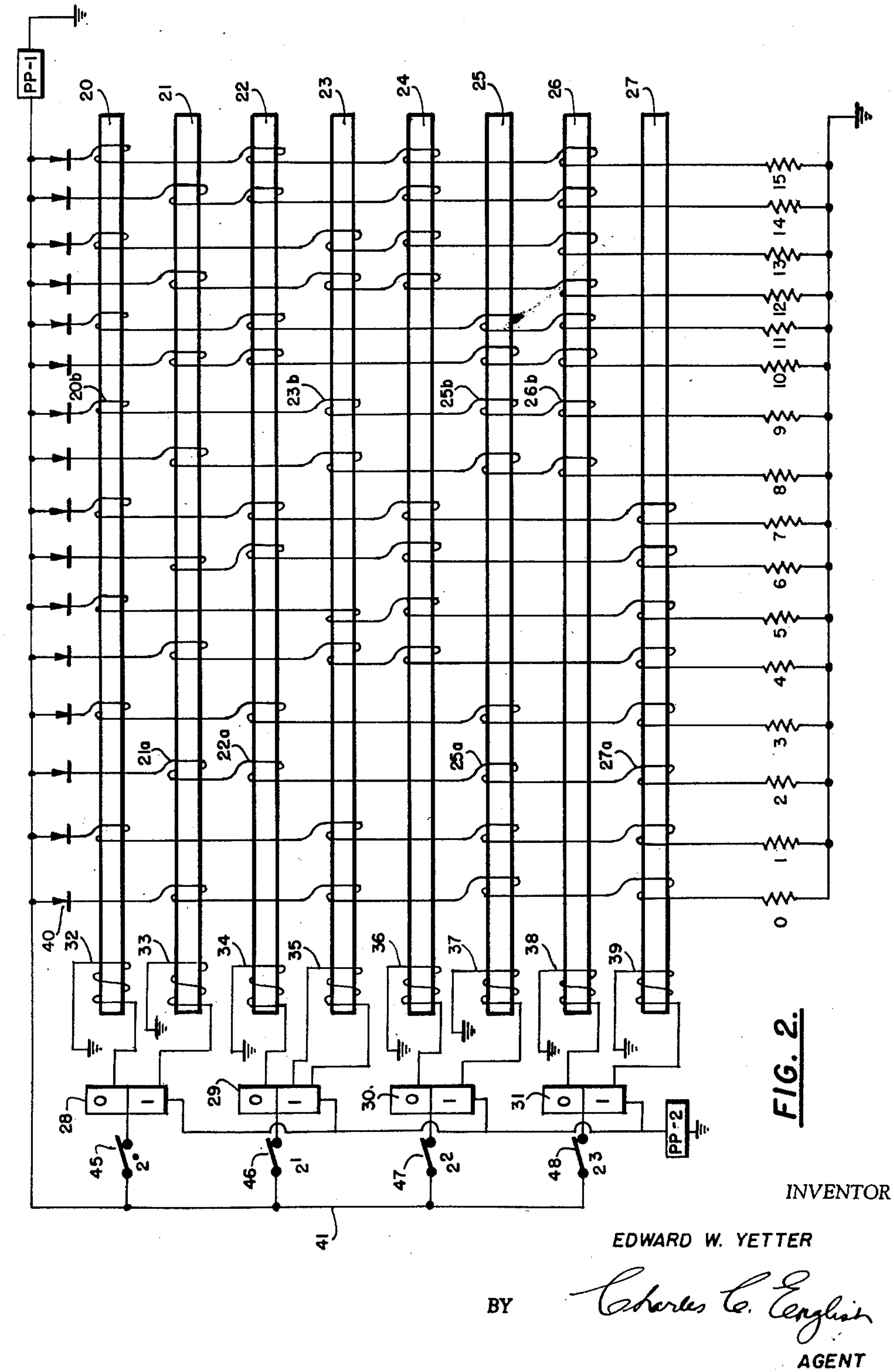
Figure 2 is a schematic diagram of one form of the invention.

Figure 1 is a table showing the conversion between the decimal and binary systems. For example, 13 in the decimal system is equal to $2^0+2^2+2^3$. Figure 2 is a system for converting binary signals into a linear set according to the conversion table of Figure 1.

Cores 20 to 27 inclusive respectively have input coils 32 to 39 inclusive. These input coils are controlled by circuits 28, 29, 30 and 31. As hereinbefore stated, the invention has two primary objects, one to increase the gain and another to improve the input circuit. So far as increasing the gain is concerned, it is not necessary that circuits 28 to 31 inclusive be of the magnetic amplifier type, as they could be of the more conventional vacuum tube type which is well known in the art. However, for best results, it is desirable to use circuits of the magnetic amplifier type, hereinafter explained in more detail.

In a functional sense, the operation of these circuits is as follows. Circuit 28 has an input 41 connected to a suitable source of electricity PP–1, together with switching means 45 which applies no signal to the circuit when there is no $2^0$ power signal to be fed thereto. In this case, the "0" end of the circuit 28 produces a pulse output to coil 32 but there is no output from the "1" side of the circuit to the coil 33. However, when it is desired to apply a $2^0$ binary signal to the apparatus, an input is applied via switching means 45. In this event there is no signal from the "0" side and hence no current in coil 32, but there is a pulse from the "1" side which flows through coil 33. Circuits 29, 30, and 31 operate in a way similar to circuit 28.

A square wave alternating current pulse generator PP–1 feeds current through sixteen vertical columns, each of which includes a rectifier, such as 40, and a plurality of coils on selected cores. The vertical columns respectively include output resistors 0 to 15 inclusive. Only positive excursions of the source PP–1 may flow through the rectifiers to the vertical columns and these positive pulses, flowing through the coils on the core, tend to drive the core in the direction of positive saturation. The coils 32 to 39 inclusive, when energized, tend to drive the cores in the opposite direction, that is toward negative saturation. It can be assumed that at the start of the apparatus, all of cores 20 to 27 inclusive are at positive remanence. The circuits 28 to 31 are so arranged that they apply pulses to the coils 32 to 39 inclusive only during negative excursions of source PP–1, as will hereinafter become apparent.

From the foregoing it is apparent that source PP–2 operating through circuits 28 through 31 functions to reset the cores 20 through 27 during the negative half cycles of PP–1. In this connection it should be recognized that during this resetting action the combined voltages induced in any given vertical set of the serially connected coils, unless certain precautions are taken, may prevent core reset. This effect can be overcome in a number of ways; a typical example would be to make the negative half cycles of PP–1 larger than the combined voltages induced in any given vertical set of its serially connected coils.

Depending on which of switching means 45 to 48 inclusive are closed, some of the cores will be driven, by their complementary coils 32 to 39, to negative remanence and the remaining cores will remain at positive remanence during each negative excursion of source PP–1. The next positive excursion of source PP–1 will then tend to drive current through all sixteen of the vertical columns. Whenever there is a coil on the core which is at negative remanence at the start of said next positive excursion (of the source PP–1), that particular coil will have high impedance. In all of the vertical columns, except one, there will be at least one coil which has high impedance. The vertical column in which all of the coils have low impedance will allow current to flow therethrough to its output.

Having thus in a general way described the operation of the system, a few specific examples will be given. Assume that a signal corresponding to number "2" in the binary system is fed to the apparatus. This means that switching means 46 will be closed, and switching means 45, 47 and 48 will remain open. Hence, coils 32, 35, 36 and 38 will have a pulse therethrough and therefore cores 20, 23, 24 and 26 are flipped to negative remanence. There is no pulse, however, in coils 33, 34, 37 and 39, whereby cores 21, 22, 25 and 27 remain at positive remanence. Hence, any and all coils on cores of the latter group will have low impedance. The remaining coils on the cores will have high impedance. The only vertical column in which all of the coils have low impedance is the column containing coils 21*a*, 22*a*, 25*a* and 27*a*.

If it now be assumed that the binary signal correponding to number "9" is fed to the input, the operation would be as follows. Switching means 45 and 48 would be closed and switching means 46 and 47 would be open. During the spaces between positive excursions of source PP–1 there would be positive pulses in coils 33, 34, 36 and 39. No pulses would appear in coils 32, 35, 37 and 38; therefore only cores 21, 22, 24 and 27 will be reset to negative remanence. The remaining cores will stand at positive remanence. The only vertical column having coils on the four cores which stand at positive remanence is the ninth vertical column containing coils 20*b*, 23*b*, 25*b* and 26*b*, and all of which have low impedance. Therefore, a positive excursion of source PP–1 may readily flow therethrough to the resistor representing number "9."

One important feature of this invention is the inclusion of diodes such as 40 in the system. When source PP–1 goes negative, it applies a negative potential to the anodes of these diodes, whereby the diodes are cut off. During positive excursions of the source PP–1, current may freely flow through the diodes when all the coils in a given vertical column have low impedance. By virtue of the inclusion of these diodes in the circuit, a large gain appears. That is, the output power in the output resistor may be many times the power required of the input. It is here that the system exhibits one great advance over the prior art.

Another improvement in this circuit is that devices of the magnetic amplifier type are employed for the circuits 28 to 31 inclusive. This results in a simpler operation since magnetic amplifiers are inherently pulse-forming and can supply pulses to reset the cores during the spaces between positive excursions of source PP–1. The way of carrying out this feature of the invention is now to be described in more detail.

Circuits 28, 29, 30 and 31 of Figure 2, may be flip-flop circuits of the type shown in the copending application of William J. Bartik, entitled "Electrical Circuit Having Two or More Stable States" filed April 29, 1955, Serial No. 504,974; or of the type shown in the copending application of Theodore H. Bonn, entitled "Electrical Circuit With Two Stable States" filed March 29, 1955, Serial No. 497,549. Both of these applications disclose flip-flop circuits with set and reset inputs as well as two separate outputs. These circuits have two stable states. Energizing the set input places the device in the first stable state wherein there is a pulse at the first output but none at the second output. The device remains in this stable state until the reset output is energized, at which time a pulse appears at the second output but not at the first.

Figure 3:
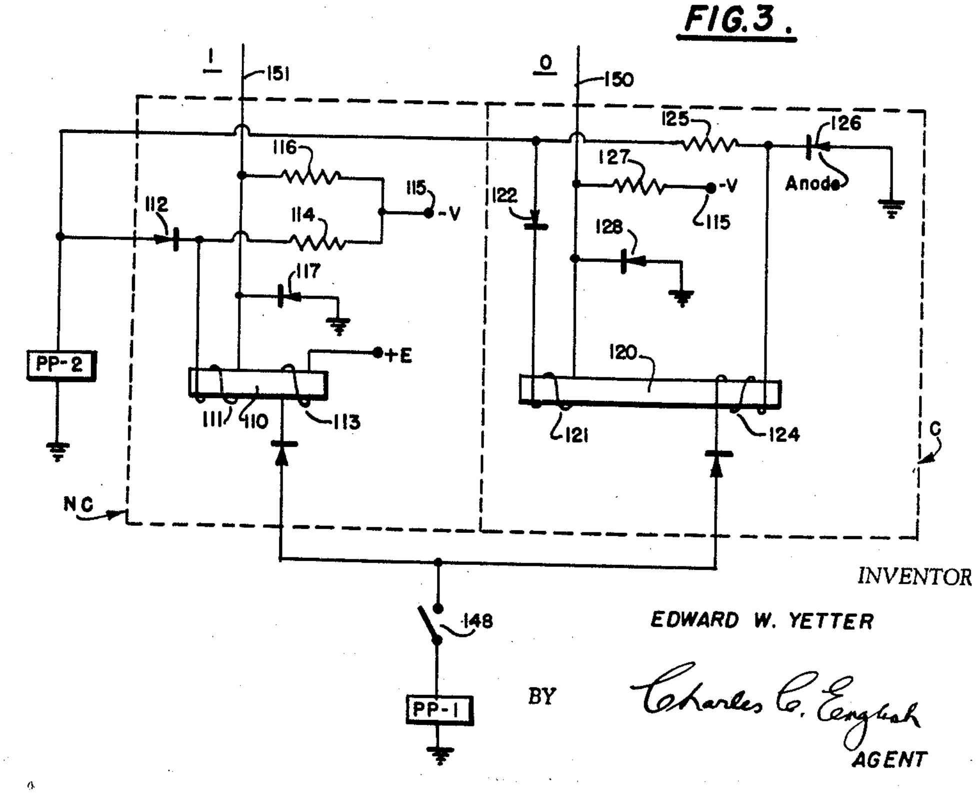
Figure 3 illustrates one form which the circuits 28, 29, 30 and 31 of Figure 2 may take.

In some cases it is desirable to substitute for the flip-flop circuits described in the above applications, a modified form of circuit which has two outputs and only one input. When the input is energized, pulses appear only at the first output; and when the input is not energized, pulses appear only on the second output. The latter form of circuit is shown in Figure 3 wherein there is a non-complementing magnetic amplifier NC and a complementing magnetic amplifier C, both fed by a common input switch 138 connected to a source of square wave alternating current power pulses PP–1. The source PP–1 has positive excursions which occur during the spaces between the positive excursions of source PP–2, as shown in Figure 4A. When switch 138 is closed, the operation is as follows. During the first positive excursion of source PP–1, a negative magnetizing force on core 110 is set up in coil 113. There is also a positive magnetizing force in the core resulting from flow of current from ground, rectifier 117, power winding 111, resistor 114, to negative source 115. These two magnetizing forces cancel and consequently the core remains at positive remanence. The next positive excursion from source PP–2 flows through rectifier 112, finds low impedance in coil 111 and therefore flows therethrough to output 151.

So long as switch 138 is closed, this operation continues. There is no output at 150 since pulses from source PP–1, flowing through coil 124, reset core 120 to negative remanence. Positive pulses from source PP–1 may flow through coil 124 since at the interval that these positive pulses occur, source PP–2 has gone negative and has caused a flow of current from ground through rectifier 126, resistor 125 to source PP–2. This has lowered the cathode of rectifier 126 to ground potential. Therefore there is a potential difference across coil 124. Since the core 120 is at negative remanence at the time the next positive excursion of source PP–2 occurs, current will flow from that source through rectifier 122, but will find coil 121 with high impedance since any current in that coil will necessarily tend to drive the core 120 from negative to positive remanence. Therefore, the output current will be small and in fact will be neutralized by the sneak suppressor 115—127—128 which causes a small flow of current of substantially equal magnitude to the sneak current. Hence, when switch 138 is closed, pulses from source PP–2 will appear at output 151 but not at output 150.

If switch 148 is open, no current will flow in coil 113. Therefore during negative excursions of source PP–2 core 110 will be reset to negative remanence by flow of current from ground, rectifier 117, coil 111, resistor 114, to source 115. The next positive excursion of source PP–2 will therefore tend to drive core 110 from negative to positive remanence, whereby coil 111 will have high impedance and only a small current will flow through coil 111. This current will be neutralized by the sneak current suppressor 115—116—117, which causes a small flow of current to oppose that tending to flow through the coil 111. On the other hand, there will be output signals at 150 since the input coil 124 will not be energized and core 120 will remain at or above positive remanence. Therefore coil 121 will have low impedance and will allow the positive excursions of source PP–2 to readily flow therethrough.

Figure 4:
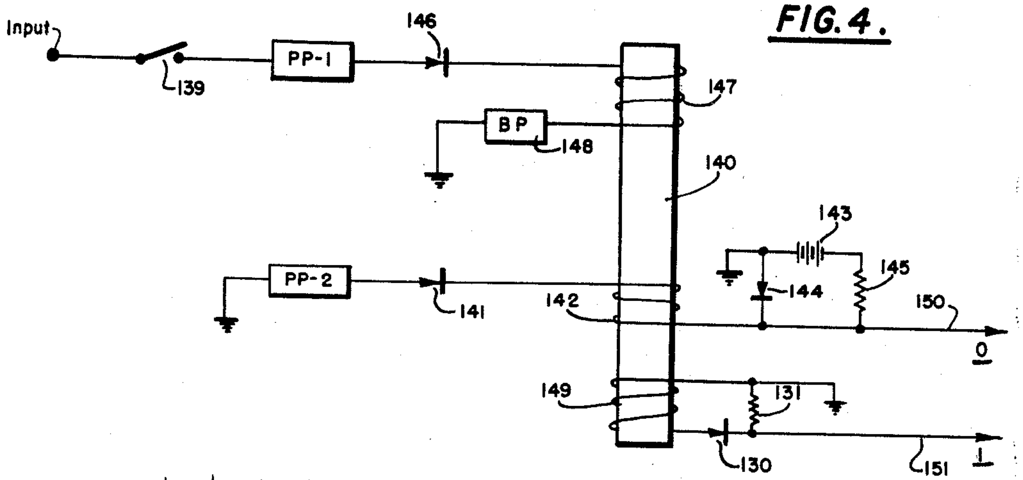
Figure 4 is a modified form of the circuit shown in Figure 3.
Figure 4A:
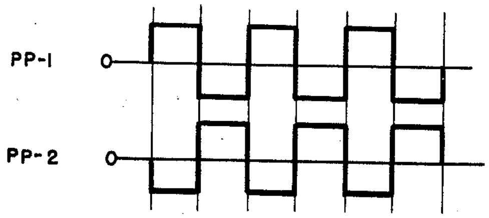
Figure 4A is a timing diagram for pulses of Figures 2, 3 and 5.

Another form of input circuit is shown in Figure 4. This circuit has a core 140 (composed of material with a substantially rectangular hysteresis loop), a power winding 142, an output winding 149, and an input winding 147. Sources PP–1 and PP–2 are square wave alternating current sources which are out of phase with each other so that one goes positive when the other goes negative, all as shown in Figure 4A. Blocking pulse generator 148 produces a train of positive pulses which occur in phase with (and of the same duration as) positive excursions of source PP–2. Source BP has no negative excursions.

Assume for purposes of illustration, that the core has remained at or above positive remanence for a substantial period of time, while switch 139 was open. In this situation, the operation of the device is as follows. Coil 147 is not energized. Every positive excursion of source PP–2 flows through rectifier 141, coil 142 to output 150. This drives the core from positive remanence to positive saturation. After each positive excursion of source PP–2 the core returns to positive remanence. There is a signal at output 150. There is very little rate of change of flux in the core during these operations and no potential is induced in output coil 149 and no signal appears at output 151. If it now be assumed that switch 139 is closed so that the next positive pulse of source PP–1 flows through rectifier 146, coil 147 and blocking pulse generator 148, to ground, the action will be as follows, remembering that the positive excursion of source PP–1 occurred during an interval when the potential across blocking pulse generator 148 was zero and at a time when source PP–2 was negative and was therefore cutting off rectifier 141. Positive pulses from source PP–1, flowing through coil 147, will revert that core to negative remanence which will cause a rate of change of flux in coil 149; but since rectifier 130 is connected to oppose the flow of output current in this particular instance, no current flows through resistor 131 or to output 151. However, the next positive excursion of PP–2, flowing through rectifier 141 and coil 142, will tend to drive the core back from negative remanence to positive remanence. Coil 142 will have high impedance during this action and there will be a large rate of change of flux in core 140. Therefore a large induced potential in coil 149 will cause a flow of current through rectifier 130 and resistor 131, producing a pulse at output 151. Due to the high impedance of coil 142, the current flowing therethrough will be very small and it will be canceled by the sneak suppressor 143—144—145. The battery 143 tends to cause a flow of current through the rectifier 144 and the resistor 145 equal to the sneak current tending to flow through coil 142, when the latter has high impedance, and therefore cancels this current so that none of it appears at the output 150.

It is clear from the foregoing description, that when the input switch 139 is open, a pulse appears at output 150 but not at output 151. On the other hand, when switch 139 is closed, there will be a pulse at the output 151 but none at output 150.

It is clear from the foregoing description that in the case of every binary signal fed into the input circuits 28, 29, 30, and 31, all four of these circuits will have output pulses timed to occur in synchronism with each other. This follows since all output signals from circuits 28, 29, 30 and 31 can only occur during positive excursions of source PP–2.

While, for the sake of simplicity, the inputs have been shown in Figure 2 as simple switches $2^0$, $2^1$, $2^2$, and $2^3$ (which bear reference numbers 138 and 139 in Figures 3 and 4), it is noted that in a more complete data translating or computing system a circuit or device of much greater complexity than a simple switch would usually be used. Those skilled in the art fully understand this as well as many ways of doing it, remembering always that it is preferable to feed the triggering pulses into the input coils of circuits 28, 29, 30 and 31 only during spaces between positive pulses of source PP–2, whereby to control the next positive pulse of source PP–2. There are, however, many circuits that could be substituted for circuits 28, 29, 30 and 31 that would produce the required synchronized pulses in one or more of coils 32 to 39.

It is also noted that while there are only four binary inputs $2^0$, $2^1$, $2^2$ and $2^3$ and sixteen output circuits, the same principle can be expanded without limit. In like manner the circuit of Figures 5, 6 and 8 which follow, may be expanded.

The system of Figure 2 is shown in the form of a complementing magnetic amplifier in that the only means provided for resetting the cores are the input coils. They reset selected cores during the spaces between positive excursions of source PP–1, thus giving some of the coils high impedance and others low impedance.

Figure 5:
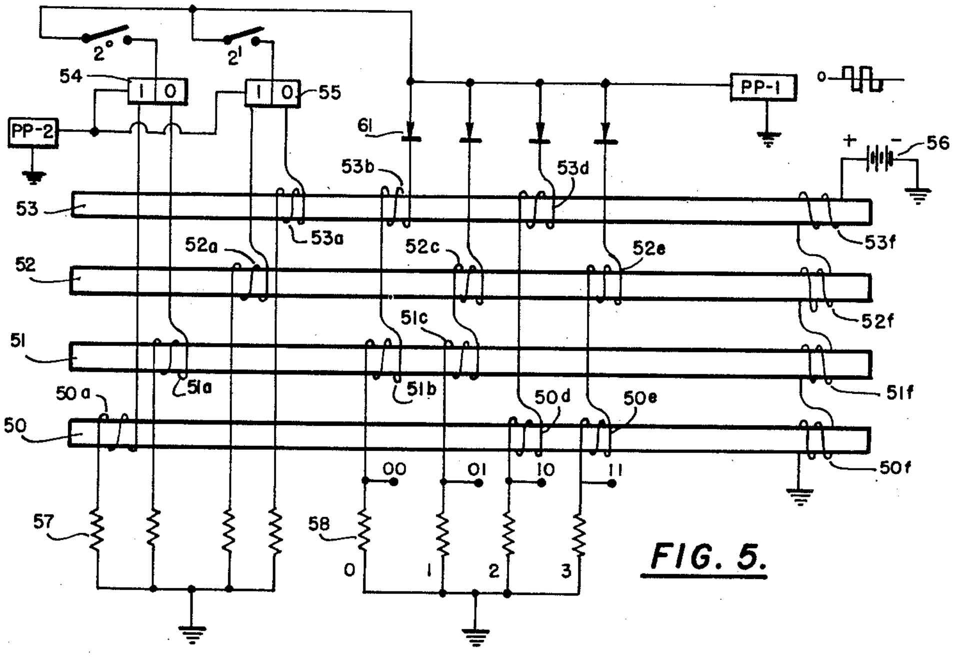
Figure 5 is a schematic diagram of a modified form of Figure 2.

Figure 5 is an arrangement similar to that of Figure 2, but operating on the principle of a non-complementing magnetc amplifier. In this form of system there are four cores 50 to 53 inclusive, each of which has a coil **50*f*, 51*f*, 52*f* and 53*f* connected to a current source 56. This source tends to supply current through the coils 50*f* to 53*f* which tends to reset all cores to negative remanence. The power pulse generator PP–1 tends to pass current through rectifiers, such as 61, during positive excursions and thence through coils on the cores. The magnetizing forces due to this operation are in opposite direction from those resulting from current source 56. Circuits 54 and 55 are connected to coils 50*a* to 53*a* inclusive, and apply magnetizing forces to the cores which also tend to oppose the magnetizing forces created by current source 56 together with coils 50*f* to 53*f*. Circuits 54 and 55** may be similar to Figures 3 and 4, described above.

If there are no signals in any of coils **50*a* to 53*a* during the spaces between positive excursions of source PP–1, coils 50*f* to 53*f* would reset all cores to negative remanence. The next positive excursion of source PP–1 would tend to pass current through the coils connected thereto and would tend to drive all four cores back to positive remanence. Following this pulse, coils 50*f* to 53*f* would drive all cores back to negative remanence, and the next positive pulse from source PP–1 would drive all cores back to positive remanence. In other words, the cores would all operate along unsaturated portions of their hysteresis loops, and all of the coils connected to source PP–1 would have high impedance and there would be no signals in any of the output resistors 0, 1, 2 or 3. If, however, it now be assumed that coils 50*a*, 51*a*, 52*a* and 53*a*** are present and are selectively supplied with positive pulses during the spaces between positive excursions of source PP–1, the operation will be as follows.

Assume that both flip-flops (or other circuits) 54 and 55 are in the "0" position. Coils **51*a* and 53*a* will be energized, but coils 50*a* and 52*a* will not. Since this energization will occur between positive excursions of source PP–1, the effects during that space of coils 51*f* and 53*f* will be cancelled so that cores 51 and 53 will remain at positive remanence. Cores 50 and 52 will be reset to negative remanence. Coils 51*b*, 53*b*, 51*c* and 53*d* will all have low impedance while coils 50*d*, 52*c*, 50*e* and 52*e* will all have high impedance. The only one of the four vertical columns which then has low impedance is the "0" column containing coils 51*b* and 53*b*. Hence, the next positive excursion of source PP–1 will readily flow through rectifier 61, coils 53*b* and 51*b*** to the "0" output resistor.

If binary signals representing number "3" are fed into the system, it means that both circuits 54 and 55 emit a pulse at their "1" sides, whereby coils **50*a*, and 52*a* are energized and cores 50 and 52 remain at positive remanence. The only output coils then which have low impedance are coils 50*e* and 52*e***. Hence, the next positive excursion of source PP–1 energizes the "3" output resistor.

Figure 6:
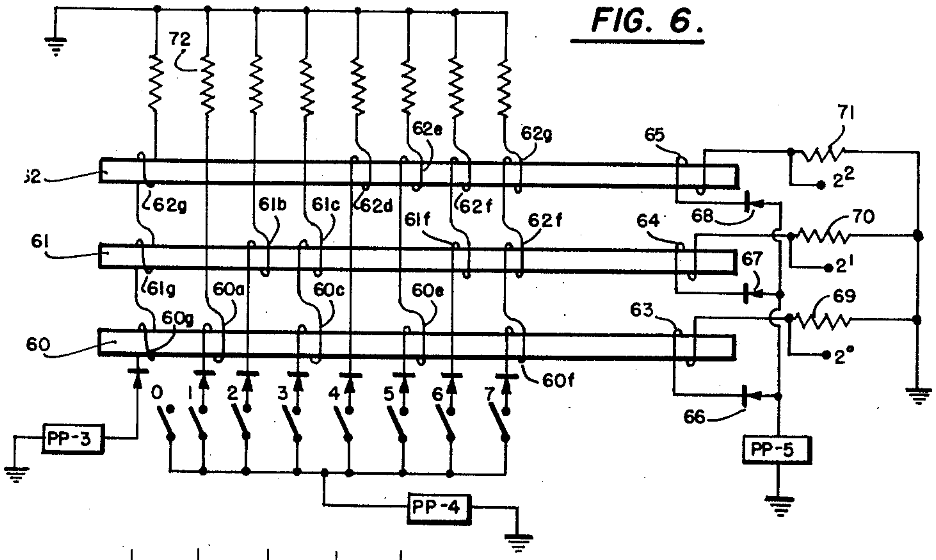
Figure 6 is a schematic diagram of a system for converting a linear set into binary signals as contemplated by the invention.
Figure 7:
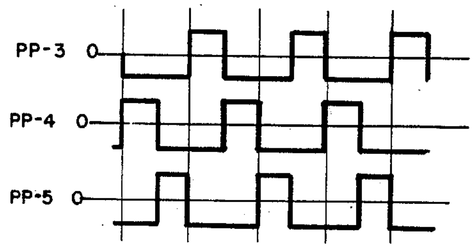
Figure 7 is a timing diagram for the device Figure 6.

Figure 6 is a modified form of the invention for converting the octal notation into the binary notation. There are three generators of power pulses having timing diagrams as shown in Figure 7. There are eight inputs 0 to 7 inclusive, which energize seven vertical columns of coils. Each vertical column has a resistor such as 72 to insure that the current flow therethrough is essentially constant, notwithstanding changes in impedance of the coils.

It may be assumed that at the start of the operation, all cores are at positive remanence. If now a coil on any one of the cores is energized, that core will be reset to negative remanence. If a core has been thus reset to negative remanence, the output coil 63, 64 or 65, as the case may be, will have high impedance to the flow of the next positive excursion of the source PP–5 therethrough; and hence, there will be little output in the appropriate output resistors 69, 70 and 71. In this form of the invention, a signal across a given output resistor indicates a particular binary signal. For example, if it is desired to indicate the binary signal $2^0$, there will be an output signal across resistor 69 but none across resistors 70 and 71.

Having given a general explanation of the operation, two specific examples will now be given. Assume that octal number "3" is to be converted into the binary system. The switching means corresponding to input channel 3 is closed, whereby coils 60*c* and 61*c* are energized, setting cores 60 and 61. Hence, coils 63 and 64 have low impedance and there are signals in output resistors 69 and 70. However, core 62 remained at negative remanence due to prior action of source PP–3 via coils 60*g*, 61*g*, 62*g* and coil 65 had high impedance whereby there was no output signal across resistor 71. The signal at resistors 69 and 70 indicated that $2^0$, as well as $2^1$, were the binary outputs of the device and these are equal to number "3."

If it further be assumed that the switch corresponding to the octal number "6" is closed, coils 61 and 62 are energized, setting cores 61 and 62, whereby coils 64 and 65 have low impedance. This means that there are substantial output signals in resistors 70 and 71. However, core 60 remains at negative remanence, coil 63 has high impedance and there is no positive pulse at 69. The energization of resistors 70 and 71 indicates that the binary numbers $2^1$ and $2^2$ have appeared at the output and these are equal to number "6."

It is noted that the positive excursions of sources PP–3, PP–4 and PP–5 may occur at three different time intervals. Assuming that the positive excursion of source PP–4 occurs first, it sets such of the cores as are selected in order to give the desired binary output. The next positive excursion of source PP–5 flows through the coils on the cores and indicates which were set (by producing an output). Later, the positive excursion of source PP–3, flowing through coils 60*g*, 61*g* and 62*g* returns all the cores to negative remanence so that the apparatus is ready for another operation. In another contemplated mode of operation, the pulses of source PP–3 are concurrent with those of source PP–4 and may, in fact, be from the same source. In yet another mode of operation, source PP–3 is replaced by a current source such as 56 of Figure 5.

An important feature of this invention is the inclusion of diodes 66, 67 and 68, et al., in the circuit, whereby there is a large gain in the output, the same as described in connection with Figure 2.

Figure 8 is a further modified form of the invention wherein a linear set is converted to binary notation. The cores 80 to 83 inclusive have coils 80*a* to 83*a* inclusive connected in series with each other and with rectifiers 84, as well as with square wave alternating current power source PP. The positive excursions of source PP, flowing through the coils in series with that source, tend to induce potentials in the secondary coils, such as 80*d*, 82*c*, etc. On the other hand, if there are no inputs on coils 80*e* to 83*e* inclusive, the positive excursions of source PP will saturate all four of the cores and there will be very little change of flux therein in response to the pulses of source PP, and hence very little voltage induced in the output coils 80*d*, 82*c*, etc. If, however, during the spaces between positive excursions of source PP, one or more of the coils 80*e* to 83*e* inclusive are energized, the appropriate core will be reset so that the next positive excursion of source PP will drive it along an unsaturated portion of its hysteresis loop and induce a large potential in the output coils on that core. These output coils are connected to the binary outputs 85 to 87 inclusive and therefore give binary output signals corresponding to the input signals. For example, assume that a pulse representing number "2" is fed through coil 81*e* during a space between positive excursions of source PP. Core 81 will be reset but the other cores 80, 82, and 83 will remain at positive remanence. Hence, potential will be induced in coil 81*c* which will cause current flow in output 86, but no potentials will be induced in the coils connected to outputs 85 and 87. Hence, output 86 is the only one which is energized.

If it be assumed that input 3 is energized by a pulse during the next negative excursion of source PP, so that coil 82*e* reverts the core 82, the next positive excursion of source PP will drive cores 80, 81 and 83 along saturated portions of their hysteresis loops and thus induce very little potential in the coils on those cores, but will drive core 82 along a unsaturated portion of its hysteresis loop inducing a large potential in coils 82*d* and 82*c*, thereby producing output signals at outputs 85 and 86. These two outputs represent binary signals $2^0$ and $2^1$, which, added together, equal the number "3."

I claim to have invented:

1. In a data translating system for converting signals representing symbols of a first system into signals representing symbols of another system, a saturable core for each symbol of the first system, control means for controlling the region of the hysteresis loop on which each core operates in accordance with the signals representing the symbols of the first system, a plurality of loads for providing outputs representing the second system, a plurality of coils on the cores connected via rectifier means in series with said loads to deliver signals of the second system to said loads and a source of spaced pulses coupled to said loads via said coils and rectifier means for producing pulses in selected ones of said loads dependent upon the region of the hysteresis loops on which the core for the coil is operating as determined by said control means.

2. Apparatus for changing information according to one system to the same information in a second system, comprising a plurality of cores, at least one primary winding on each core, at least one secondary winding on each core, a first source of regularly spaced pulses for energizing selected ones of said primary windings according to the information of said one system, output means connected to each of said secondary coils, and a second source of regularly spaced pulses connected to said secondary windings for energizing said secondary windings during time intervals between the occurrence of pulses from said first source, whereby the information fed to the primaries from said first source causes approximate changes in the impedances of the secondary coils so that said second source produces outputs at selected ones of said output means according to the second information system.

3. An apparatus for converting information from the binary notation to the linear set notation, comprising a plurality of cores, first pulse means, means to control resetting of the said cores including a plurality of input driving devices, each input driving device having two outputs and control means which in response to a first input condition allows a pulse from said first pulse means to flow to one output but not to the other of said outputs and which in response to a second input condition prevents a pulse from said first pulse means from flowing to said one output but allows a pulse from said first pulse means to flow to said other output, means for controlling said input driving devices comprising means for feeding binary signals into the apparatus, two cores of said plurality of cores being associated respectively with each input driving device, a primary winding on each core, each primary winding being connected to a different output circuit of the input driving devices, a group of secondary windings for each number of the linear set, the group of secondary windings representing each given number of the linear set including a winding on each core which will remain in the same region of its hysteresis loop during the feeding of the binary number complementary to the given linear set number into the apparatus, second pulse means tending to pass pulses through each group of secondary windings in a direction which will tend to saturate those cores which have remained in one region of their hysteresis loops and will tend to flip those cores which were previously flipped by the input means, whereby the pulses fed through the secondary from said second pulse means windings will find a low impedance path for that group of secondary windings which represents the chosen linear set number and will find a high impedance in all of the other groups of secondary windings, and output means for each group of secondary windings which is energized when the group of secondary windings presents low impedance to a pulse fed thereto from said second pulse means.

4. A device as defined in claim 3 in which each of said cores has a substantially rectangular hysteresis loop.

5. A device as defined in claim 4, the circuit including means whereby the pulses fed to the input means by said first pulse means are out of phase with those fed to the secondary windings by said second pulse means.

6. Apparatus for converting information from the binary notation to the linear set notation comprising a first source of spaced pulses, a plurality of input driving devices each having two outputs, each of said driving means including means responsive to one input condition for allowing pulses from said source to flow through one output but not the other and responsive to another input condition for allowing pulses from said source to flow through the other output but not the first output, each said driving device including magnetic amplifier means for passing or impeding flow of pulses from said source to said outputs according to which of said input conditions exists, two cores for each input driving circuit, a primary winding on each core, each primary being connected to a different output of the input driving devices, a group of secondary windings for each linear set number, the group of secondary windings representing each given linear set number including a winding on each core wherein a change of flux does not occur when that linear set number should appear, a second source of spaced pulses for tending to pass pulses through the groups of secondary windings, and output means connected to each group of secondary windings.

7. A device as defined in claim 6, wherein said first and second sources are so selected that the pulses fed to the input means and to the secondary windings are out of phase with each other, whereby said second source of spaced pulses tends to pass current through said secondary windings during time intervals between the pulse excursions of said first source.

8. Apparatus according to claim 7 in which the cores are composed of a material having a substantially rectangular hysteresis loop.

9. Apparatus for converting numbers of a linear set into numbers of the binary system comprising a plurality of cores each representing a given binary number including $2^0$, $2^1$ and $2^2$, an input circuit for each linear set number to be fed into the system and including input circuits for linear set numbers 1 to 7 inclusive, the input circuit for linear set number 1 including a coil on the $2^0$ core, the input circuit for linear set number 2 including a coil on the $2^1$ core, the input circuit for linear set number 3 including coils on the $2^0$ and $2^1$ cores, the input circuit for linear set number 4 including a coil on the $2^2$ core, the input circuit for linear set number 5 including coils on the $2^0$ and $2^2$ cores, the input circuit for linear set number 6 including coils on the $2^1$ and $2^2$ cores, the input circuit for linear set number 7 including coils on the $2^0$, $2^1$ and $2^2$ cores, a source of pulses having spaced excursions of predetermined polarity, rectifier means coupling said source to a selected one of said input circuits whereby a pulse excursion of said predetermined polarity effects current flow through the coils of said selected input circuit, and output means comprising a further source coupled to output coil means on each core for producing an output signal depending on the change in state of the core as effected by the input coils.

10. The device of claim 9 in which said output means comprises an output coil on each core, a load in series with each output coil, said further pulse source comprising a source of power pulses tending to force pulse current through each of said coils to said load so that any core which is not reset by an input coil will allow the power pulses to effect appreciable current flow through the output coil thereof whereas the output coils which are on cores which have been reset by an input coil will present high impedance to said power pulses.

11. Apparatus for converting information in the binary system of notation into information in a linear set notation comprising a plurality of groups of cores with two cores in each group, each core having a plurality of output windings and only one input winding thereon, a plurality of input driving means with one such means for each group of cores, each input driving means having two otuputs which respectively are connected to the two input windings on the two cores of the group associated with the particular input driving means, each input driving means having two different output-producing states in one of which it produces a signal on one but not the other of its outputs and in the other of which it produces a signal on its other but not its said one output, means to control each input driving means to place it in one or the other of its two output-producing states according to whether or not a binary "0" or a binary "1" signal is fed thereto, and output means comprising a plurality of loads coupled respectively to different grouped pluralities of said output windings carried respectively by different ones of said cores, said output means including a source of pulses tending to force pulse current through the said different grouped pluralities of output windings toward said loads according to the impedances of the windings in said grouped pluralities of windings.

12. Apparatus as defined in claim 11 in which said cores have substantially rectangular hysteresis loops and in which the input driving means tends to apply current to its associated coils to reset selected cores during the spaces between the pulses of the output means so that the pulses of the output means drive the cores to saturation when they have not been reset and flip those cores which were reset.

13. Apparatus for converting information in one system of notation into information in another system of notation comprising a plurality of groups of cores with two cores in each group, each core having only one input winding thereon, each core having at least one output winding thereon, a plurality of input driving means with one such means for each group of cores, each input driving means having two outputs which respectively are connected to the two input windings on the two cores of the group associated with the particular input driving means, each input driving means having two stable states in one of which it produces a signal on one but not the other of its outputs and in the other of which it produces a signal on its other but not its said one output, means to control each input driving means to place it in one or the other of its stable states, and output means comprising a plurality of series circuits, each series circuit including output windings linked to one and only one of the two cores comprising each group, said output means including a pulse generator tending to drive pulse current through each series circuit and the output means being arranged so that those cores which were not reset by the input means will be driven to saturation by the pulse current flowing through the coils thereon and those cores which were reset by the input means will be flipped through an unsaturated operating region by the current flowing through the coils thereon, whereby the only selected ones of said series circuits exhibit a low impedance to the pulse output of said generator.

14. Apparatus according to claim 13 in which each input driving means comprises at least one magnetic amplifier having a pulse output.

15. Data translating apparatus having an input for receiving signals according to the binary system comprising a plurality of groups of cores with two cores in each group, each core having only one input winding thereon, means controlling resetting of the cores including a plurality of input driving means with one such means for each group of cores, each input driving means having two outputs which respectively are connected to the two coils on the two cores of the group associated with the particular input driving means, each input driving means having two states in one of which it produces a signal on one but not the other of its outputs and in the other of which it produces a signal on its other but not its said one output, means to control each input driving means to place it in one or the other of its states according to whether or not a binary "0" or a binary "1" signal is fed thereto, a source of spaced pulses, means whereby the input driving means produces its signals only during the spaces between said pulses, and output means comprising a plurality of series circuits respectively fed by said source of spaced pulses, each series circuit having coils on selected cores whereby that particular series circuit will provide low impedance to a pulse only if all of the cores associated with the series circuit were not reset.

16. A data translating system according to claim 15 in which each input driving means comprises bistable magnetic amplifier means having two output coils controlled by at least one magnetic core and according to the state of saturation of such core in such a way that when pulses are flowing in one of the output coils they are not flowing in the other and vice versa, and input means controlling the saturation of the last-named core, said output coils of the bistable magnetic amplifier means being respectively connected to the two coils on the two cores of the group which is associated with the bistable magnetic amplifier means.

17. In a data translating system, a plurality of magnetic cores having coils thereon, a plurality of loads, rectifier means interconnecting said coils and loads in a plurality of series circuits, different ones of said series circuits including coils on different ones of said cores respectively, a source of pulses having spaced pulse excursions of predetermined polarity, said source being coupled to said series circuits for driving current via said coils and rectifier means to said loads during said predetermined polarity pulse excursions, whereby an output current is effected in given ones of said loads when the coils in series therewith exhibit a relatively low impedance to pulse excursions of said predetermined polarity from said source, said coils being so wound on said cores that current flow through said coils from said source produces a magnetomotive force of predetermined magnetic polarity in each of said cores, and control means operable intermediate the occurrence of said spaced pulse excursions from said source for applying a magnetomotive force opposite to said predetermined magnetic polarity to selected ones of said cores whereby selected ones of said coils exhibit a relatively high impedance to a next subsequent pulse excursion from said source.

18. The combination of claim 17 wherein said control means comprises a plurality of control coils carried by said plurality of cores respectively, a plurality of bistable devices each of which has a pair of complementary outputs and means coupling said control coils in pairs to the complementary outputs of said bistable devices respectively, whereby one only of each of said pairs of coils is energized in dependence upon the output state of the bistable associated with said pair, and signal means coupled to said bistables for controlling the output state of each of said bistables.

19. The combination of claim 18 including a plurality of bias coils on said cores, a source of current coupled to said bias coils for producing a magnetomotive force opposite to said predetermined magnetic polarity in each of said cores, said control coils being so wound on said cores as to produce a magnetomotive force of said predetermined magnetic polarity in said cores, whereby energization of selected ones of said control coils nullify the magnetomotive force produced by selected ones of said bias coils.

References Cited in the file of this patent

UNITED STATES PATENTS 2,734,182 Rajchman ______________ Feb. 7, 1956